(12) United States Patent
Uosawa et al.

(10) Patent No.: US 9,979,917 B2
(45) Date of Patent: *May 22, 2018

(54) INFORMATION PROCESSING APPARATUS, INFORMATION PROCESSING SYSTEM, COMPUTER-READABLE NON-TRANSITORY STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventors: Junki Uosawa, Kyoto (JP); Janos Boudet, Paris (FR); Sebastien Guido, Paris (FR); Laurent Hiriart, Paris (FR)

(73) Assignee: NINTENDO CO., LTD., Kyoto-shi (JP)

( * ) Notice: Subject to any disclaimer, the term of this patent is extended or adjusted under 35 U.S.C. 154(b) by 402 days.

This patent is subject to a terminal disclaimer.

(21) Appl. No.: 14/518,180

(22) Filed: Oct. 20, 2014

(65) Prior Publication Data

US 2016/0057371 A1    Feb. 25, 2016

(30) Foreign Application Priority Data

Aug. 21, 2014  (JP) .................................. 2014-168527

(51) Int. Cl.
*A63F 13/213* (2014.01)
*A63F 13/55* (2014.01)
(Continued)

(52) U.S. Cl.
CPC ........... *H04N 5/3765* (2013.01); *A63F 13/06* (2013.01); *A63F 13/10* (2013.01);
(Continued)

(58) Field of Classification Search
CPC ...... G06F 3/013; G06F 1/3231; G06F 1/3265; G06F 3/038; G06F 1/3203; G06F 1/3206;
(Continued)

(56) References Cited

U.S. PATENT DOCUMENTS

| 8,644,564 B1* | 2/2014 | Patton ................. G06K 9/00228 382/118 |
| 2007/0189583 A1 | 8/2007 | Shimada et al. |
| 2009/0251560 A1* | 10/2009 | Azar ....................... G06F 21/32 348/222.1 |
| 2012/0314914 A1* | 12/2012 | Karakotsios ....... G06K 9/00255 382/118 |

(Continued)

FOREIGN PATENT DOCUMENTS

| EP | 2 515 526 | 10/2012 |
| JP | 2008-181468 | 8/2008 |

OTHER PUBLICATIONS

Extended European Search Report dated Nov. 10, 2014 issued in corresponding European Application No. 14187410.7 (7 pgs.).

*Primary Examiner* — Tsion B Owens
*Assistant Examiner* — Alison Slater
(74) *Attorney, Agent, or Firm* — Nixon & Vanderhye P.C.

(57) ABSTRACT

An example information processing apparatus including an infrared light emitter capable of emitting infrared light and a camera capable of at least taking an infrared light image is provided. In the information processing apparatus, first, an image taken by use of the camera is obtained. A face detection process based on the image is repeatedly executed. Then, based on a result of the face detection process, emission of the infrared light is stopped and emission of the infrared light is resumed after a lapse of a predetermined time period.

8 Claims, 9 Drawing Sheets

(51) Int. Cl.
*H04N 5/376* (2011.01)
*A63F 13/20* (2014.01)
*A63F 13/40* (2014.01)
*H04N 5/33* (2006.01)
*H04N 5/232* (2006.01)
*G06K 9/00* (2006.01)

(52) U.S. Cl.
CPC ..... *G06K 9/00228* (2013.01); *H04N 5/23219* (2013.01); *H04N 5/23241* (2013.01); *H04N 5/33* (2013.01); *G06K 9/00221* (2013.01)

(58) Field of Classification Search
CPC ........ G06F 1/3287; G06F 21/32; G06F 3/011; G06F 3/0304; G06F 3/0325; G06F 3/0425; G06K 9/2027; Y02B 60/1289; Y02B 20/40; Y02B 20/44
See application file for complete search history.

(56) References Cited

U.S. PATENT DOCUMENTS

| | | |
|---|---|---|
| 2013/0050395 A1 | 2/2013 | Paoletti et al. |
| 2013/0337789 A1* | 12/2013 | Johnson ................. H04W 4/02 455/414.1 |
| 2014/0062882 A1* | 3/2014 | Ozawa ................... G06F 3/038 345/158 |
| 2015/0102995 A1* | 4/2015 | Shen ...................... G06F 3/013 345/156 |
| 2015/0157930 A1* | 6/2015 | Emori ................. G07F 17/3211 463/36 |
| 2015/0199003 A1* | 7/2015 | Zhang ................... G06F 3/013 345/156 |
| 2016/0029962 A1* | 2/2016 | Hyde ................... A61B 5/6896 600/301 |
| 2016/0057365 A1* | 2/2016 | Uosawa ............. G06K 9/00228 348/164 |

* cited by examiner

F I G. 1
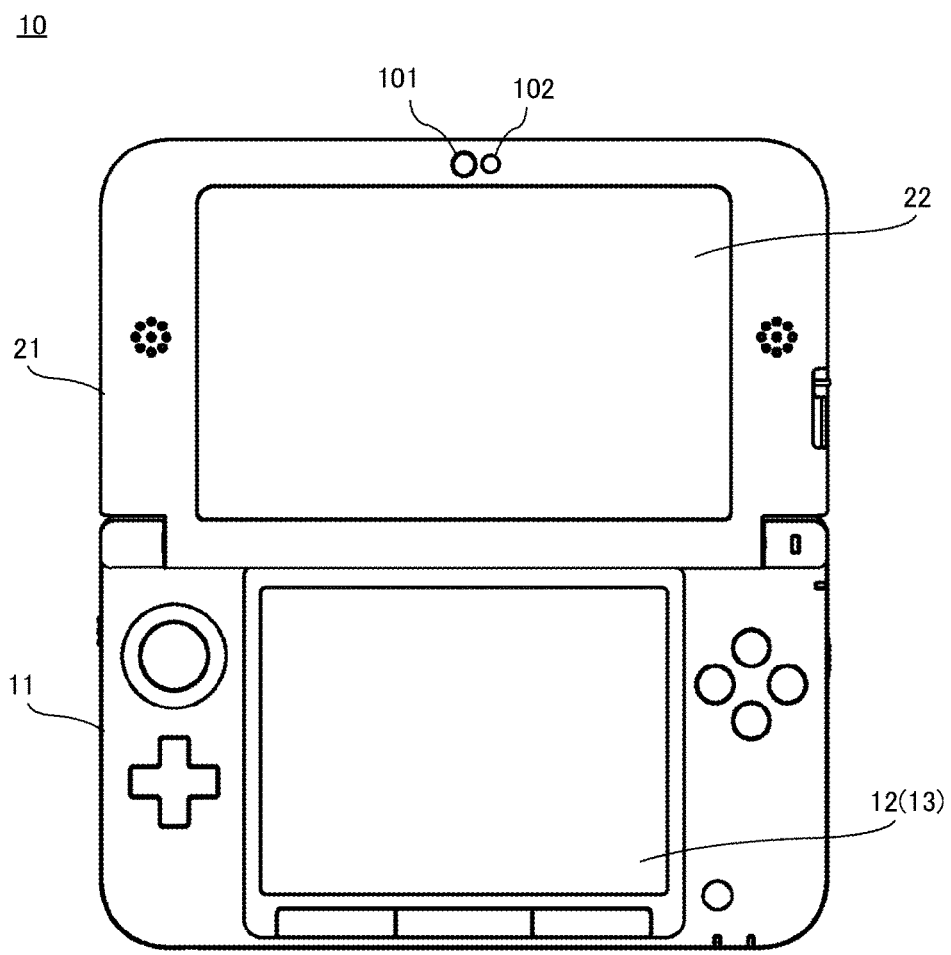

F I G. 5
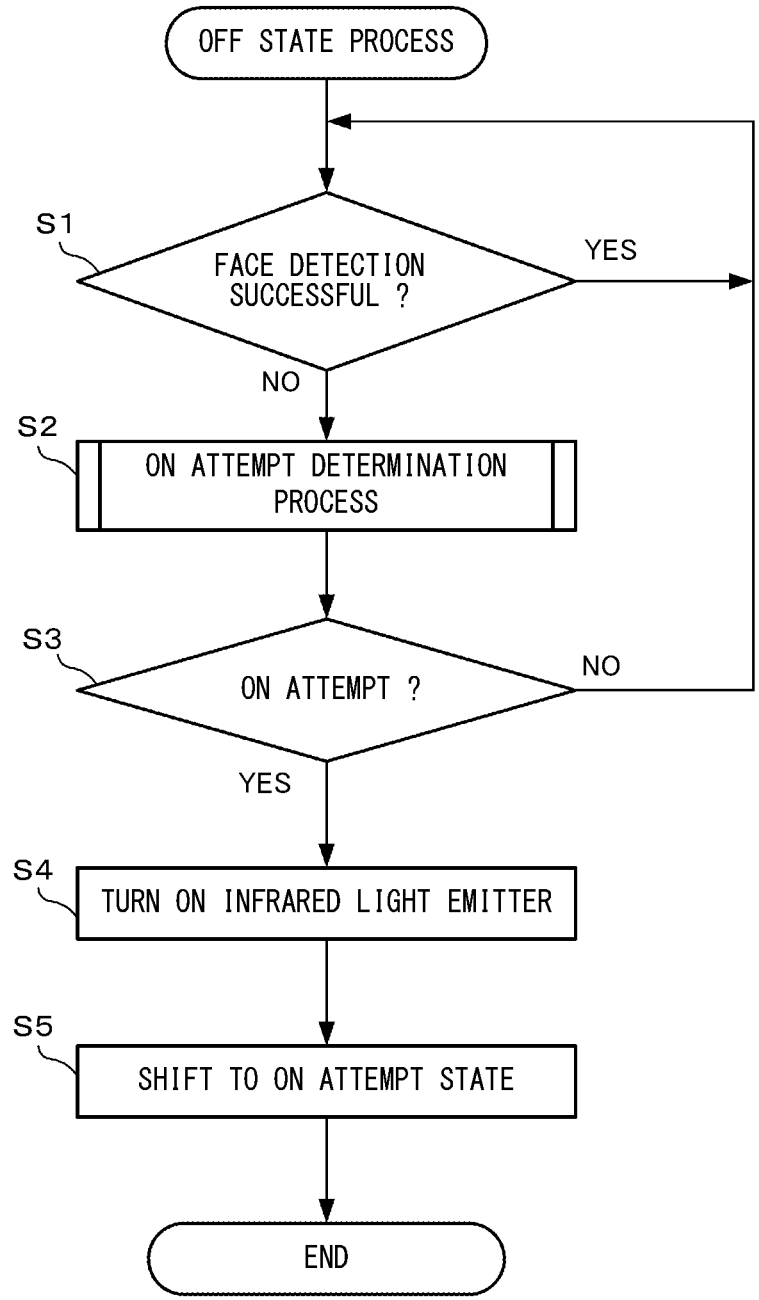

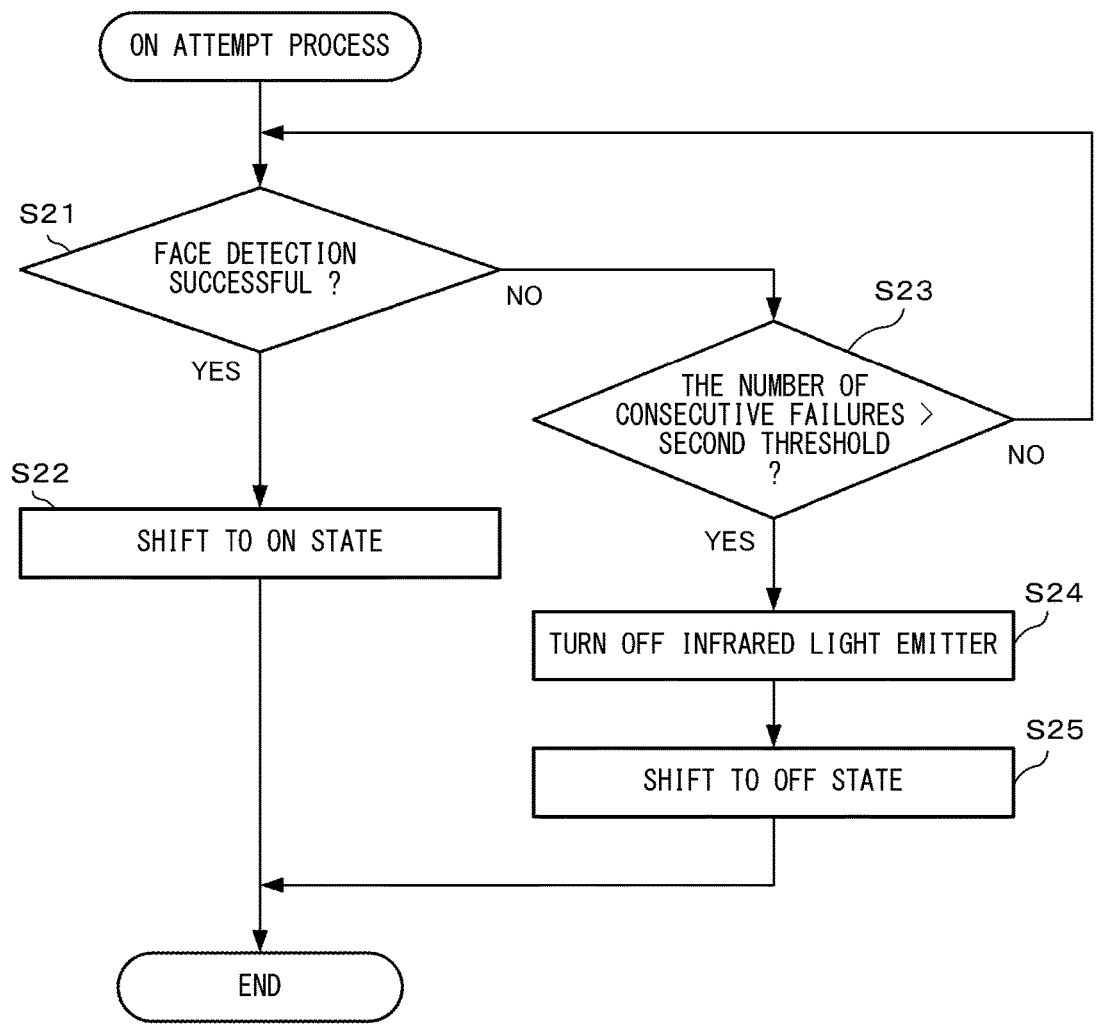
F I G. 7

F I G. 1 0
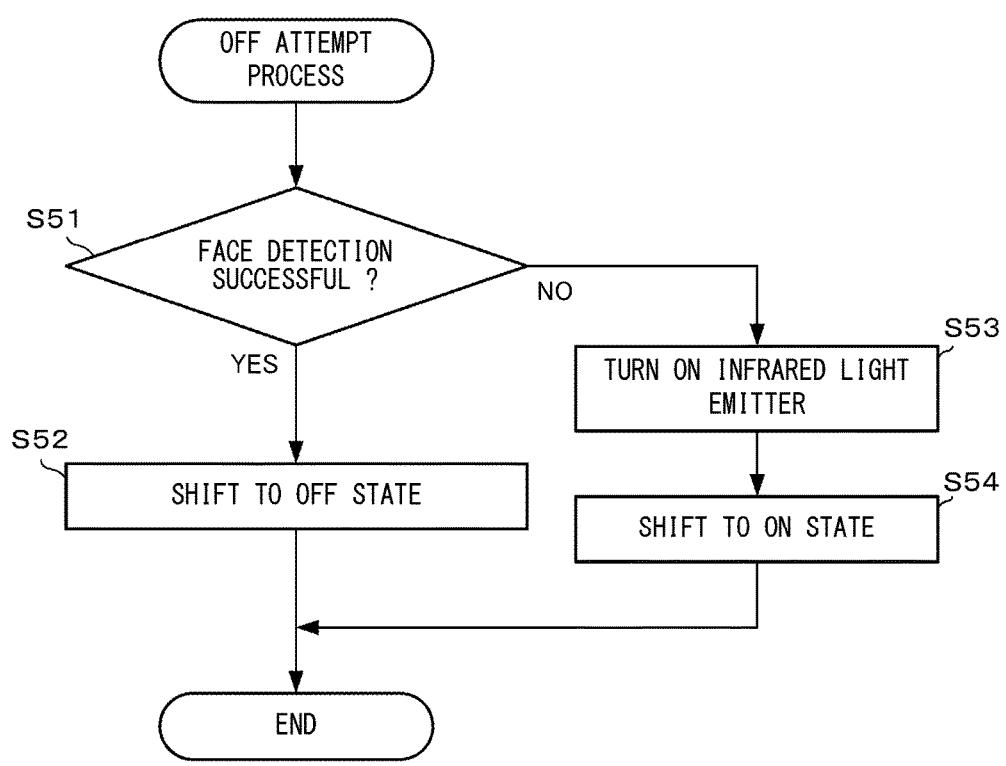

INFORMATION PROCESSING APPARATUS, INFORMATION PROCESSING SYSTEM, COMPUTER-READABLE NON-TRANSITORY STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2014-168527, filed on Aug. 21, 2014, is incorporated herein by reference.

FIELD

The exemplary embodiments herein relate to an information processing apparatus including: an infrared light emitter capable of emitting infrared light; and a camera capable of at least taking an infrared light image, and more particularly, relate to an information processing apparatus capable of performing face detection based on at least an infrared light image.

BACKGROUND AND SUMMARY

Conventionally, there has been known a technology in which infrared light is emitted to a face, reflected light of the emitted infrared light is detected to be outputted as an infrared light image, and face recognition is performed by use of the infrared light image.

In the above technology, power consumption due to emission of infrared light is not particularly taken into consideration. Thus, in a case where the above technology is applied to, for example, a hand-held information terminal that operates on a battery, there is room for improvement in terms of battery consumption used for emission of infrared light.

Therefore, an object of the present exemplary embodiments is to provide an information processing apparatus, an information processing system, a computer-readable non-transitory storage medium having stored therein the information processing program, and an information processing method, which are capable of reducing power consumption due to emission of infrared light and at the same time capable of maintaining convenience of face detection using infrared light.

In order to attain the above object, the following configuration examples are conceivable, for example.

One example of the configuration example is an information processing apparatus including an infrared light emitter capable of emitting infrared light and a camera capable of at least taking an infrared light image, the information processing apparatus configured to: control emission of the infrared light; repeatedly obtain an image taken by use of the camera; and repeatedly execute a face detection process based on the obtained image, wherein in the infrared light emission control, emission of the infrared light is stopped based on a result of the face detection process performed in the face detection, and emission of the infrared light is resumed after a lapse of a predetermined time period.

According to the above configuration example, while convenience by the face detection process is maintained, power consumption used in emission of the infrared light can be suppressed.

As another configuration example, in the infrared light emission control, stopping emission of the infrared light and resuming emission of the infrared light after a lapse of the predetermined time period may be repeated.

According to the above configuration example, while power consumption used in emission of the infrared light is further reduced, convenience by the face detection process can be maintained.

As another configuration example, in the infrared light emission control, emission of the infrared light may be stopped when face detection with the infrared light emitted has been failure, and emission of the infrared light may be resumed after a lapse of the predetermined time period. Further, in the infrared light emission control, emission of the infrared light may be stopped when the number of consecutive failures of the face detection has become greater than a predetermined number, and emission of the infrared light may be resumed after a lapse of the predetermined time period.

According to the above configuration example, efficient power consumption reduction can be realized.

As another configuration example, in the infrared light emission control, stopping emission of the infrared light when face detection with the infrared light emitted has been failure and resuming the emission after a lapse of the predetermined time period may be repeatedly executed, until the face detection succeeds, with the predetermined time period being gradually extended. Further, in the infrared light emission control, as a result of the predetermined time period being extended, when the predetermined time period has reached a predetermined value, the predetermined time period may not be extended any longer and stopping emission of the infrared light and resuming the emission after a lapse of the predetermined time period may be repeatedly executed.

According to the above configuration example, while power consumption is further reduced, convenience by quick face detection can be maintained.

As another configuration example, the information processing apparatus may be further configured to detect a motion of the information processing apparatus itself, and in the infrared light emission control, while stopping emission of the infrared light and resuming the emission after a lapse of the predetermined time period are repeatedly executed, when an output value of the detected motion is greater than or equal to a predetermined threshold, emission of the infrared light may be resumed regardless whether the predetermined time period has elapsed.

According to the above configuration example, for example, in a dark place, when a state where the user is not using the information processing apparatus has changed to a state where the user is using the information processing apparatus, face detection can be quickly performed.

As another configuration example, the information processing apparatus may be a hand-held information processing apparatus, or may be an information processing apparatus operable on a battery.

According to the above configuration example, while power consumption is reduced, convenience of the information processing apparatus can be enhanced.

According to the present exemplary embodiments, while power consumption used in emission of the infrared light is reduced, convenience of the face detection process can be maintained.

BRIEF DESCRIPTION OF THE DRAWINGS

FIG. 1 is an external view showing a non-limiting example of a hand-held game apparatus according to the present embodiment;

FIG. 5 shows a non-limiting example of a flow chart showing details of a process performed in an OFF state;

FIG. 7 shows a non-limiting example of a flow chart showing details of a process performed in an ON Attempt state;

FIG. 10 shows a non-limiting example of a flow chart showing details of a process performed in an OFF Attempt state.

DETAILED DESCRIPTION OF NON-LIMITING EXAMPLE EMBODIMENTS

Figure 2:
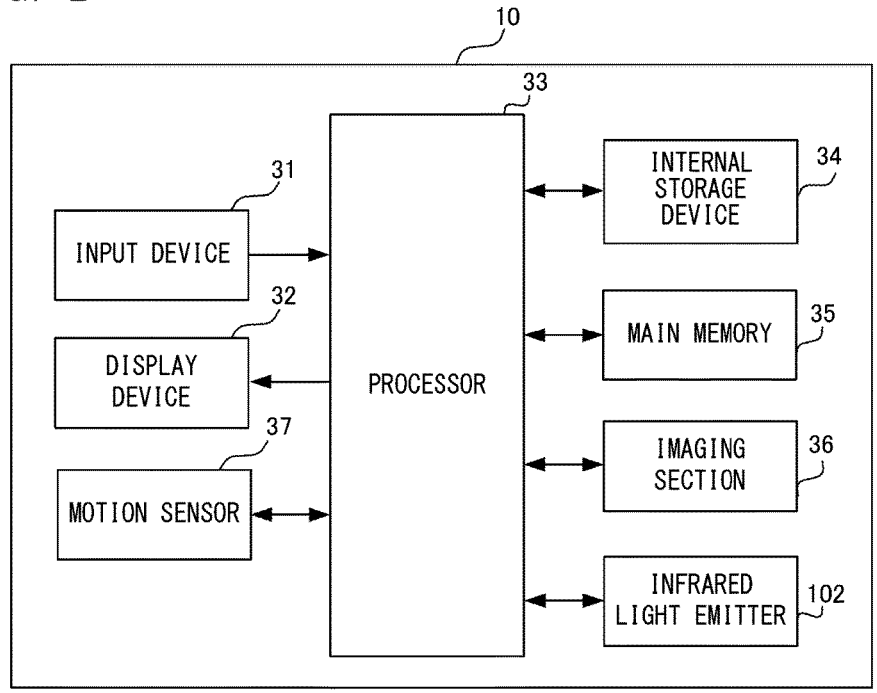
FIG. 2 is a block diagram showing a non-limiting example of a configuration of the hand-held game apparatus.

Hereinafter, one exemplary embodiment will be described. In the present embodiment, description will be given while using a hand-held game apparatus as one example of an information processing apparatus.

(Configuration of Hand-Held Game Apparatus)

FIG. 1 shows an external view of a hand-held game apparatus 10 according to the present embodiment. As shown in FIG. 1, the hand-held game apparatus 10 includes a lower housing 11 and an upper housing 21. The lower housing 11 and the upper housing 21 are connected to each other so as to be openable and closable in a folding manner (foldable). Usually, a user uses the hand-held game apparatus 10 in an opened state. When not using the hand-held game apparatus 10, the user keeps the hand-held game apparatus 10 in a closed state. The lower housing 11 is provided with a lower LCD (liquid crystal display: liquid crystal display device) 12, and a touch panel 13. In addition, the lower housing 11 is also provided with operation buttons, an analog stick, and the like. On the other hand, the upper housing 21 is provided with an upper LCD (liquid crystal display: liquid crystal display device) 22.

The hand-held game apparatus 10 includes a camera 101. The camera 101 is provided (above the upper LCD 22 in FIG. 1) on a surface of the upper housing 21. Thus, the camera 101 can take an image of the face of the user present in front of the hand-held game apparatus 10. As one example, the camera 101 can take an image of the user in a state of performing a game while viewing the upper LCD 22 or the lower LCD 12. Further, the hand-held game apparatus 10 includes an infrared light emitter 102 which emits infrared light. The infrared light emitter 102 is provided at a position adjacent to the camera 101 on the surface of the upper housing 21. In other words, the infrared light emitter 102 is provided at a position where it can emit infrared light toward a position where the face of the user would be present while the user is using the hand-held game apparatus 10 (such as while playing a game).

Here, the camera 101 can also take an infrared light image, in addition to a visible light image. Infrared light emitted from the infrared light emitter 102 irradiates the face of the user, and reflected light thereof enters the camera 101. Based on the reflected light, the camera 101 can take an infrared light image. In the present embodiment, based on an image taken by the camera 101 (visible light image or infrared light image), a process of detecting the face of the user (face detection process) is executed. A result of the face detection is used as an input for a predetermined game. Moreover, a virtual camera is set based on the positions of the eyes obtained as a result of the face detection, and a process of generating a virtual space image in accordance with the result of the face detection, and the like are also executed.

(Internal Configuration of Hand-Held Game Apparatus)

FIG. 2 is a functional block diagram of the hand-held game apparatus 10. In FIG. 2, the hand-held game apparatus 10 includes an input device 31, a display device 32, a processor 33, an internal storage device 34, a main memory 35, an imaging section 36, a motion sensor 37, and the infrared light emitter 102.

The input device 31 corresponds to the operation buttons and the touch panel 13 mentioned above. The input device 31 is operated by the user of the hand-held game apparatus 10, and outputs a signal corresponding to the operation made by the user. The display device 32 displays, on a screen, an image generated in the hand-held game apparatus 10. The display device 32 is the lower LCD 12 and the upper LCD 22 described above. The internal storage device 34 has stored therein computer programs to be executed by the processor 33 and various data to be used in the programs. The internal storage device 34 is typically a flash EEPROM. In the main memory 35, computer programs and information are temporarily stored. The motion sensor 37 is a sensor for detecting a motion made onto the housing itself of the hand-held game apparatus 10, and is an angular velocity sensor or an acceleration sensor, for example. The imaging section 36 takes an image by use of the camera 101. The infrared light emitter 102 emits (turns on/turns off) infrared light based on an instruction from the processor 33.

It should be noted that, with respect to the processor 33, processes described later may be performed by the single processor 33, or alternatively, the single hand-held game apparatus 10 is provided with a plurality of the processors 33, and the processes may be performed by use of the plurality of the processors 33 in combination.

(Outline of Information Processing According to the Present Embodiment)

Next, the outline of operations of information processing (information processing executed by the hand-held game apparatus 10) according to the present embodiment will be described. In the present embodiment, the face detection process and an infrared light emission control process are executed in parallel. Of these, for the face detection process, a known technology is used, and detailed description thereof will be omitted in the description of the present embodiment. For example, by performing pattern matching and the like based on a taken image, the face detection process is executed (then, based on a result of this face detection, predetermined information processing is performed). As for the "face detection" in the present embodiment, if the positions of the eyes have been detected, it is assumed that the "face detection" has been successful. That is, in the present embodiment, it is sufficient that the positions of the eyes are successfully detected.

Although the infrared light emission control process is also executed in parallel with the face detection process, the contents to be described in the present embodiment are about the infrared light emission control. Hereinafter, the outline of the infrared light emission control process executed in the present embodiment will be described.

First, in the present embodiment, it is assumed to use infrared light, mainly, for taking an image of the face of the user in a state where the surrounding of the hand-held game apparatus 10 is dark (a state where ambient light is insufficient). Therefore, typically, in a state where the surrounding of the hand-held game apparatus 10 is light (a state where ambient light is sufficient), the infrared light emitter 102 is in a state of "OFF" (not emitting infrared light), and in a dark state, the infrared light emitter 102 is in a state of "ON" (emitting infrared light). In the following description, the state of the infrared light emitter 102 being ON will be referred to as a "turned-on state", and the state of the infrared light emitter 102 being OFF will be referred to as a "turned-off state". Moreover, setting the infrared light emitter 102 to be ON will be referred to as "turn on", and setting the infrared light emitter 102 to be OFF will be referred to as "turn off".

Now, the following state is assumed. First, the user is using the hand-held game apparatus 10 in a dark room where no light is on. Further, face detection of the user has been successful. That is, the infrared light emitter is on, and based on the infrared light, an image of the face of the user has been taken by the camera 101, and face detection has also been successful. In such a state, for example, a case is considered where a light of the room is turned on. In this case, ambient light becomes sufficient and thus, face detection can be performed without using infrared light. In such a case, if the infrared light emitter 102 is kept on, unnecessary power will be consumed accordingly. In particular, in a case where the hand-held game apparatus 10 is operated on a battery, influence of power consumption due to unnecessary lighting of the infrared light emitter 102 is not small. Therefore, in the present embodiment, the following control is performed to reduce power consumption of the hand-held game apparatus 10. First, in a case where the infrared light emitter 102 is in the turned-on state, and face detection has been successful (hereinafter, referred to as face detection success state), the infrared light emitter 102 is set to be the turned-off state once. Then, in this state, face detection is attempted. As a result, if face detection has failed, the infrared light emitter 102 is returned to the turned-on state. On the other hand, if face detection has been successful, control is performed such that the face detection process is continued while the infrared light emitter 102 is kept in the turned-off state. In other words, while infrared light is in the turned-on state and face detection is being performed, infrared light is turned off once and face detection is attempted. As a result of that, if face detection has failed, it is determined that the room is still dark and it is a state where infrared light is necessary. On the other hand, if face detection has been successful, it is determined that the room having been dark has now become light, the hand-held game apparatus 10 has moved from a dark place to a light place, or the like, and thus, it has become a state where infrared light need not be turned on. By performing such control, in the present embodiment, it is possible to prevent occurrence of a wasteful turned-on state of the infrared light emitter 102, and to reduce power consumption.

In the present embodiment, the above control of turning off and turning on infrared light in the face detection success state is repeatedly performed. At this time, control of varying a time interval for attempting turning off infrared light is also performed. Specifically, the following control is performed: the interval (the time interval for turning off once) for switching the turned-on state to the turned-off state is started from five seconds, and increased to be finally 60 seconds. The reason for this is as follows. First, in a case where the user is using the hand-held game apparatus 10 in a dark place (especially, when control of using the face detection process is being performed), if turning off of infrared light is frequently attempted, accuracy of face detection may be decreased, which may affect user experience. On the other hand, unless turning off of infrared light is attempted periodically, even in a case where the hand-held game apparatus 10 has moved from a dark place to a light place as described above, infrared light is kept on, and influence on power consumption is concerned. Therefore, turning off of infrared light is attempted at a five second interval for some time at first, and then the attempt interval of the turning off is gradually extended, whereby it is intended to prevent accuracy of face detection from decreasing and at the same time, to reduce power consumption.

Further, in the present embodiment, the following control is also performed. For example, the following state is assumed. First, the user is using the hand-held game apparatus 10 in a dark room and face detection of the user has been successful. Then, a case is assumed in which, from this state, the user is no longer present in front of the hand-held game apparatus 10 by leaving the place or the like (the room is still dark). In such a case, it becomes a state where detection of the face of the user will continue failing (hereinafter, referred to as face detection failure state). If the infrared light emitter 102 is kept on in this state, power will be continued to be consumed accordingly. Thus, in the present embodiment, control is performed such that in a case where the face detection failure state is continued to some extent in a dark room, the infrared light emitter 102 is turned off. Further, in the present embodiment, control is also performed such that even after the infrared light emitter 102 has been turned off, the infrared light emitter 102 is turned on at a predetermined time interval. Accordingly, in a case where the user has returned to the front of the hand-held game apparatus 10, it becomes possible to quickly resume the process of detecting the face of the user. That is, in the present embodiment, the following control is performed: when a state where infrared light has been turned on and face detection has been successful has changed to a state where failure of face detection continues, infrared light is turned off once, but thereafter, after a lapse of a predetermined time period, infrared light is turned on once and face detection is attempted. As a result, if the detection has failed, infrared light is turned off again, and such control is repeated. On the other hand, if the detection has been successful, infrared light is kept on (because it is presumed that the user has returned after having left the place). Through such control, while reducing power consumption of the hand-held game apparatus 10, it is possible to prevent convenience regarding face detection of the user from being impaired.

Further, with regard to the control in the case where the user has left the front of the hand-held game apparatus 10 in a dark room as above, in the present embodiment, the following control is also performed. As described above, in a case where the face detection failure state has continued to some extent, infrared light is turned off once and after a lapse of a predetermined time period, infrared light is turned on again to attempt face detection, and this procedure is repeated. In this repetition, control is performed such that the time interval between setting the turned-off state once and switching to the turned-on state (to attempt face detection with infrared light) is varied. Specifically, this time interval is started from 1/30 seconds, and increased to be finally three seconds. That is, in a case where the user is not present in front of the hand-held game apparatus 10 in a dark place, the infrared light emitter 102 is turned on (only for an instant) every three seconds, eventually. This is for preventing the infrared light emitter 102 from being wastefully turned on because too frequent attempt of turning it on results in increased power consumption. On the other hand, there also is desire that the face detection success state is realized as quickly as possible when the user has returned after having left the place. In order to realize both in good balance, in the present embodiment, the control in which infrared light is turned on at an interval of three seconds at maximum is performed as described above.

(Details of Information Processing According to the Present Embodiment)

Details of the infrared light emission control process according to the present embodiment will be described below. First, "(internal) control state" in the process will be described. In the present embodiment, the control state includes the following four states.

(1) OFF state
(2) ON Attempt state
(3) ON state
(4) OFF Attempt state

Figure 3:
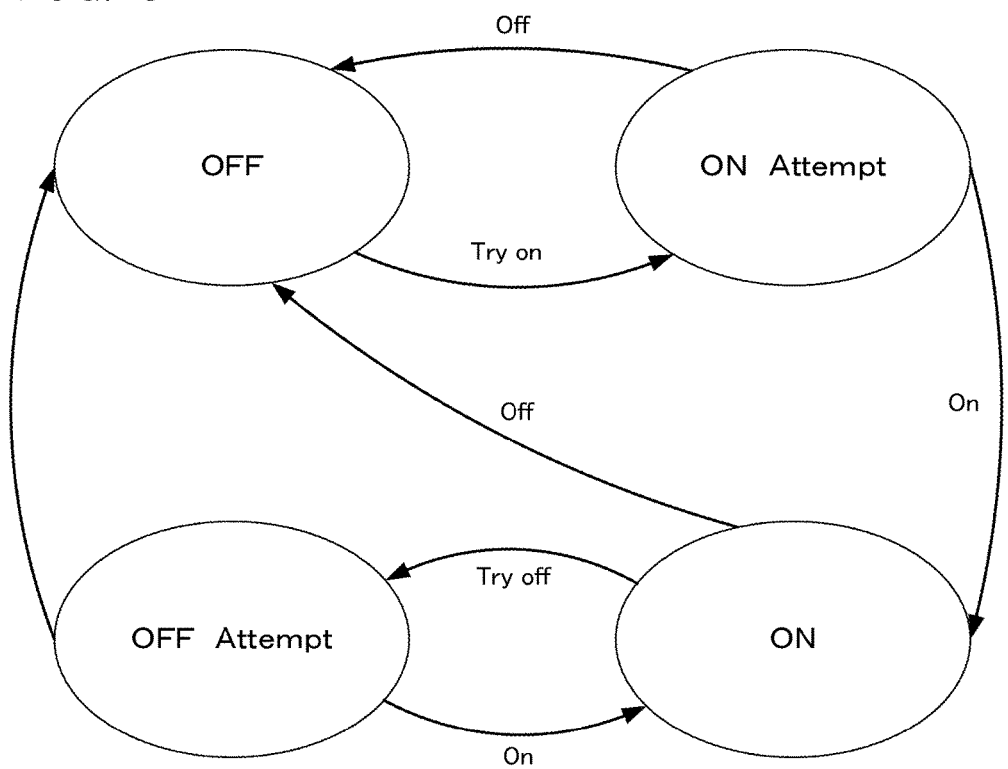
FIG. 3 shows a non-limiting example of shifts among control states in a process according to the present embodiment.

FIG. 3 shows the four control states and shifts among the states. At the time of activation of the hand-held game apparatus 10, the control state is the "OFF state".

First, (1) OFF state above is a state where the infrared light emitter 102 is off. Main processing to be executed in this state is processing regarding determination of whether face detection has been successful and determination of whether to turn on infrared light. This state can be shifted to the ON Attempt state.

Next, (2) ON Attempt state is a state where the infrared light emitter 102 is on. In this state, processing of determining whether face detection has been successful and determining whether to turn off infrared light or keep it on is mainly executed. This state can be shifted to the OFF state or the ON state.

Next, (3) ON state is a state where the infrared light emitter 102 is on. In this state, processing of determining whether face detection has been successful and determining whether to turn off infrared light is mainly executed. This state can be shifted to the OFF state or the OFF Attempt state.

Next, (4) OFF Attempt state is a state where the infrared light emitter 102 is off. In this state, processing of determining whether face detection has been successful and determining whether to keep infrared light off or turn on infrared light is mainly executed. This state can be shifted to the OFF state or the ON state.

In the present embodiment, while the control state is shifted among the four control states, the infrared light emission control process is realized.

Figure 4:
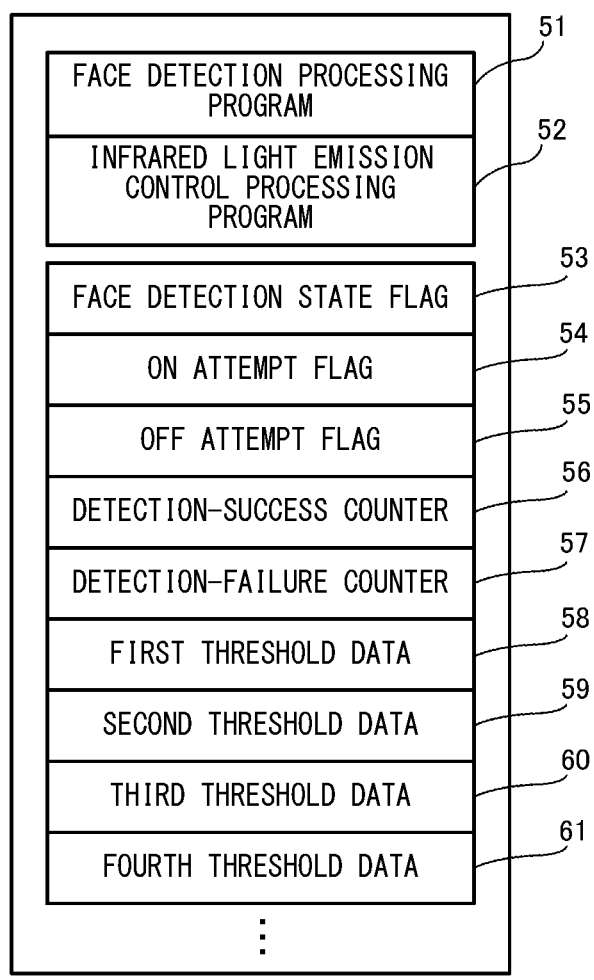
FIG. 4 is one example of programs and data stored in a main memory 35 of a hand-held game apparatus 10.

Next, main data to be used in the infrared light emission control process according to the present embodiment will be described. FIG. 4 shows one example of programs and data stored in the main memory 35 of the hand-held game apparatus 10. The main memory 35 has stored therein a face detection processing program 51, an infrared light emission control processing program 52, a face detection state flag 53, an ON Attempt flag 54, an OFF Attempt flag 55, a detection-success counter 56, a detection-failure counter 57, a first threshold data 58, a second threshold data 59, a third threshold data 60, a fourth threshold data 61, and the like.

The face detection processing program 51 is a program for executing the process of detecting the face of the user (the face detection process) based on an image taken by the camera 101. The infrared light emission control processing program 52 is a program for performing infrared light emission control as described above. Specifically, the infrared light emission control processing program 52 is a program for executing the processes of the flow charts shown in FIG. 5 to FIG. 10 described later. In the present embodiment, these programs are repeatedly executed every ⅟30 seconds (30 frames per second).

The face detection state flag 53 is a flag for indicating whether current face detection has been successful or failure as a result of the face detection process. For example, "1" is set in the case of success, and "0" is set in the case of failure. As described above, in the present embodiment, the face detection process and the infrared light emission control process are executed in parallel with each other. Then, data indicating the result of the face detection process is outputted as the face detection state flag 53. In the infrared light emission control process being executed in parallel, this flag is referred to, whereby whether the current face detection has been successful can be determined.

The ON Attempt flag 54 is a flag to be used when determining, in the OFF state, whether to make a shift to the ON Attempt state. The OFF Attempt flag 55 is a flag to be used when determining, in the ON state, whether to make a shift to the OFF Attempt state. For each of the ON Attempt flag 54 and the OFF Attempt flag 55, when ON is set, it means that making a shift is necessary, and when OFF is set, it means that making a shift is not necessary.

The detection-success counter 56 is a counter indicating the number of consecutive successes of face detection when infrared light is in the turned-on state. The detection-failure counter 57 is a counter indicating the number of consecutive failures of face detection. As described above, since the face detection process and the infrared light emission control process are repeatedly executed every ⅟30 seconds, increment by 1 is made to either one of the counters every ⅟30 seconds. These counters are reset when a shift of the control state described above has occurred.

The first threshold data 58 is a threshold for determining, when infrared light is in the turned-off state, that infrared light is to be turned on. Specifically, the value of the detection-failure counter 57 is compared with this threshold, and when the number of consecutive failures of face detection has become greater than the first threshold data, it is determined that infrared light is to be turned on. That is, the first threshold data 58 is a threshold for determining that infrared light is to be turned on because the hand-held game apparatus 10 is in a dark place. This threshold is mainly used for control in which "even after the infrared light emitter 102 has been turned off, the infrared light emitter 102 is turned on at a predetermined time interval" as described above. It should be noted that this threshold may be varied. Thus, in the present embodiment, as an initial value, a value indicating ⅟30 seconds is set. Moreover, in the present embodiment, a maximum value of the change in the first threshold data 58 is provided, and for example, it is a value indicating a time period of three seconds.

The second threshold data 59 is a threshold for determining, in the ON Attempt state, that infrared light is to be turned off. Specifically, when the value of the detection-failure counter 57 has become greater than the threshold regardless of infrared light being on, it is determined that infrared light is to be turned off. For this threshold, a fixed value is set, and in the present embodiment, a value corresponding to five frames is set. The reason for this is as follows. After infrared light has been turned on, infrared light is not immediately turned off because detection has been failure, but about five frames are waited, whereby accuracy of face detection is further increased.

The third threshold data 60 is a threshold for determining, when infrared light is in the turned-on state, that infrared light is to be turned off. Specifically, the value of the detection-success counter 56 is compared with this threshold, and when the number of consecutive successes of face detection has become greater than or equal to the third threshold data, it is determined that infrared light is to be turned off. This threshold is mainly used for control in which "in the case of the face detection success state, the infrared light emitter 102 is set to be the turned-off state once" described above. This threshold may also be varied. In the present embodiment, as an initial value, a value indicating a time period of five seconds is set. It should be noted that the third threshold data 60 is also provided with a maximum value of the change thereof. The maximum value is, for example, a value indicating a time period of 60 seconds.

The fourth threshold data 61 is a threshold for determining, in a state where infrared light is in the turned-on state and face detection has been failure, that infrared light is to be turned off. The value of the detection-failure counter 57 is compared with this threshold, and when the number of consecutive failures is greater than the threshold, it is determined that infrared light is to be turned off. This threshold is used for control in which infrared light is turned off in such a case where the user has left the front of the hand-held game apparatus 10 in a dark place as described above. For this threshold, a fixed value is set, and, for example, a value corresponding to a time period of three seconds is set. That is, in a case where the user has left the front of the hand-held game apparatus 10 in a dark place, infrared light is to be turned off once, after about three seconds.

Other than the above, although not shown, various data to be used in processes according to the present embodiment is also stored in the main memory 35 as appropriate.

Figure 6:
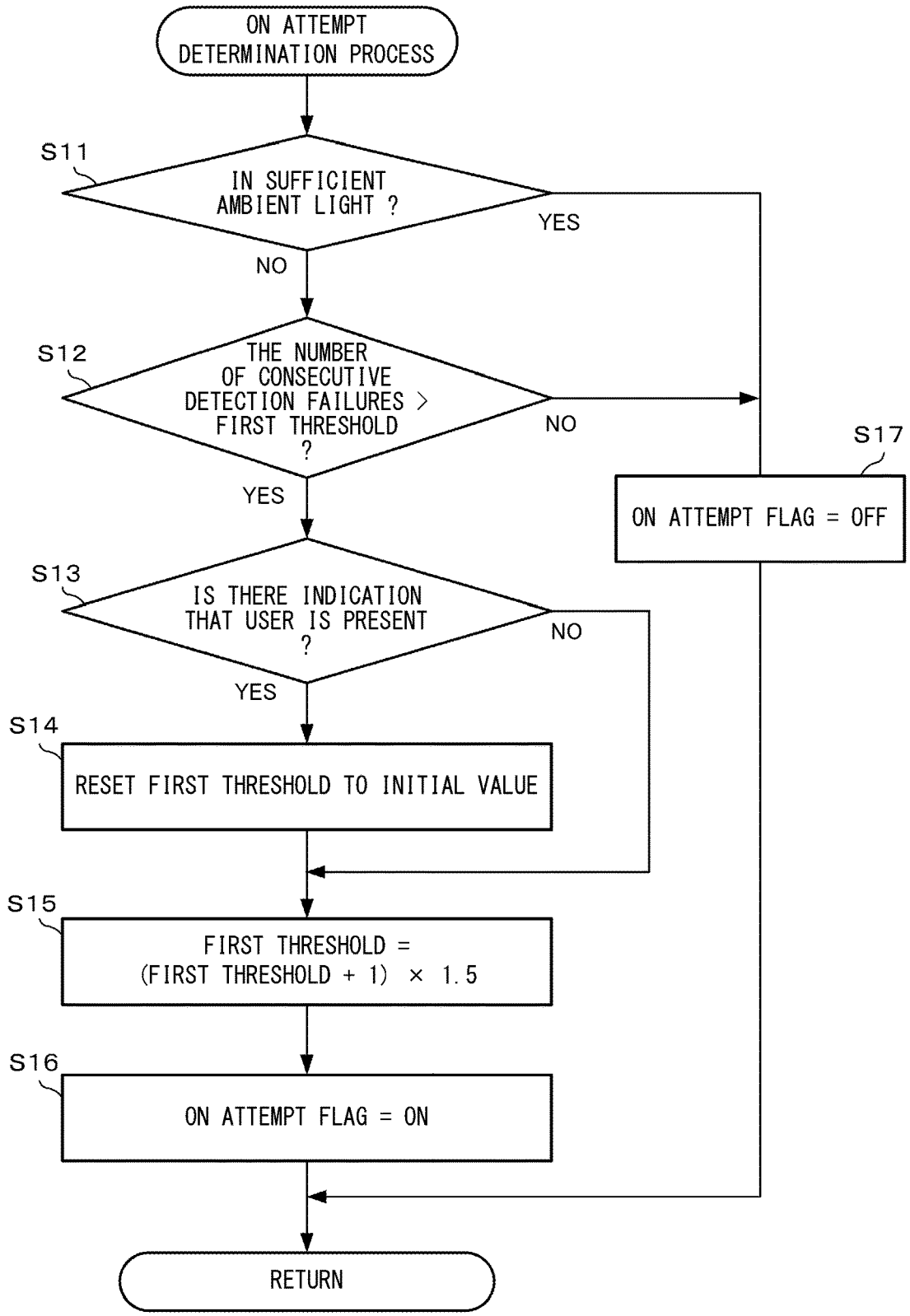
FIG. 6 shows a non-limiting example of a flow chart showing details of an ON Attempt determination process of step S2 shown in FIG. 5.
Figure 8:
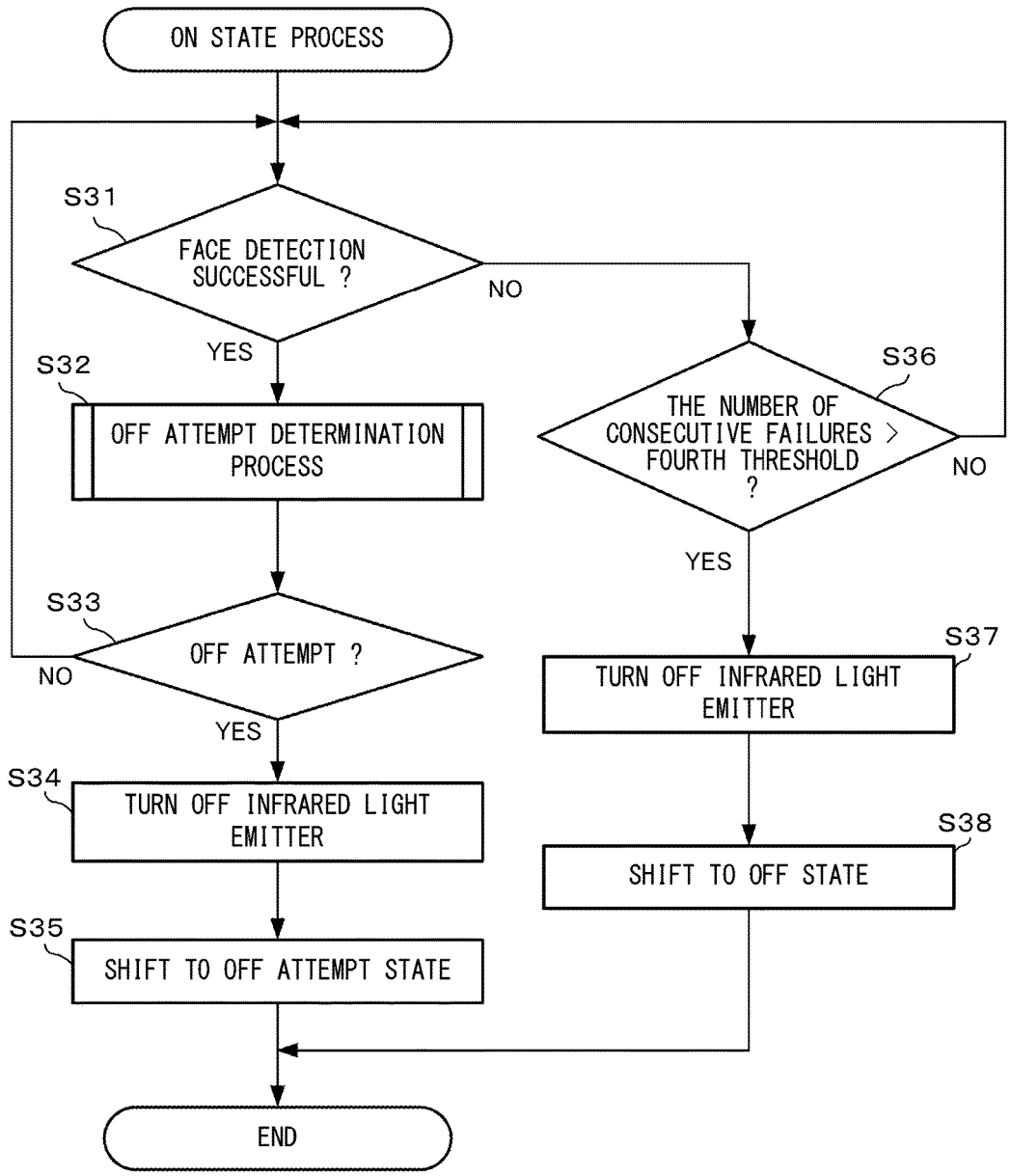
FIG. 8 shows a non-limiting example of a flow chart showing details of a process performed in an ON state.
Figure 9:
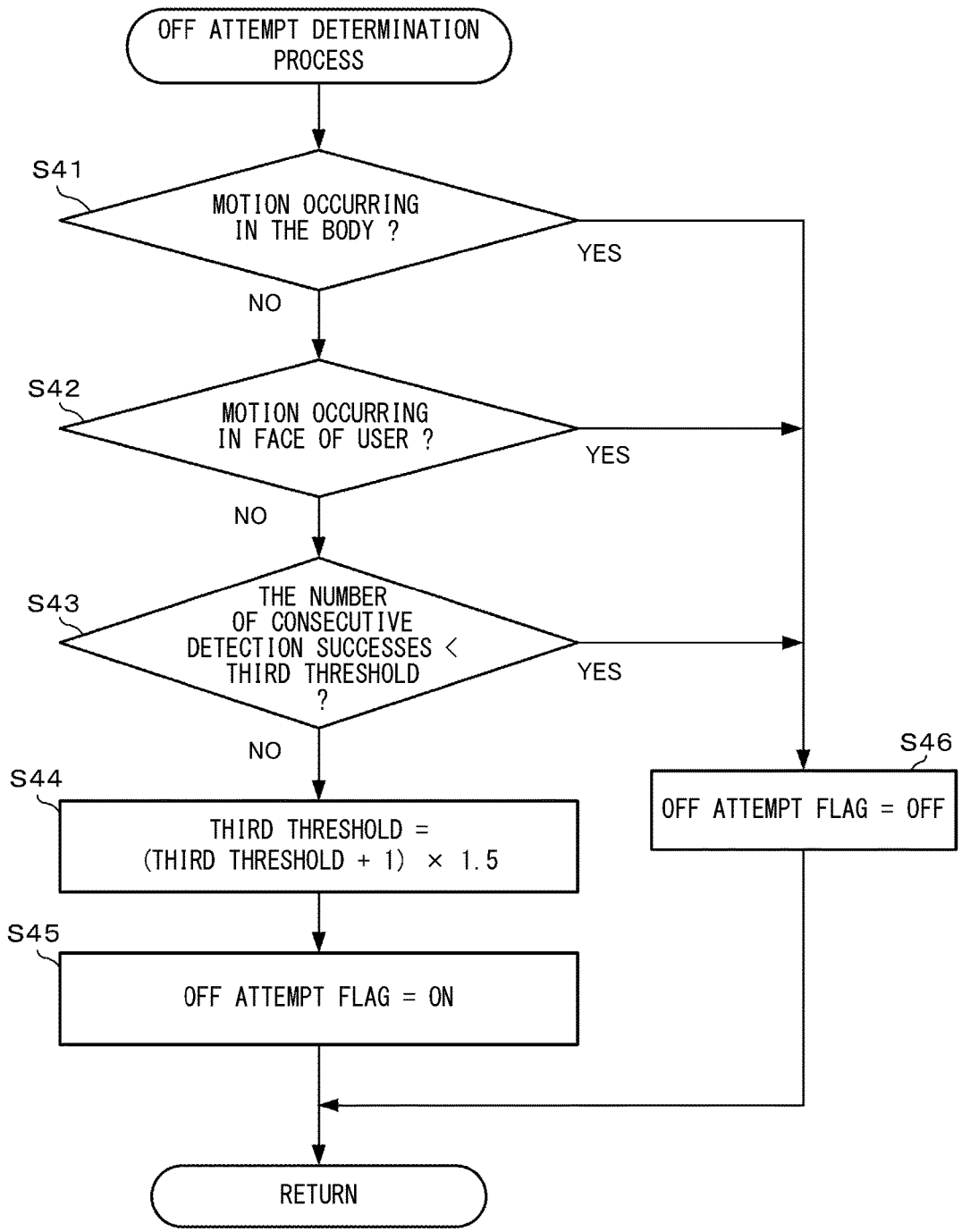
FIG. 9 shows a non-limiting example of a flow chart showing details of an OFF Attempt determination process of step S32 in FIG. 8.

Next, a detailed flow of the infrared light emission control process according to the present embodiment will be described. FIG. 5 to FIG. 10 are flow charts showing details of the processes. FIG. 5 and FIG. 6 show control processes to be performed in the OFF state described above. FIG. 7 shows a control process to be performed in the ON Attempt state. FIG. 8 and FIG. 9 show processes to be performed in the ON state. FIG. 10 shows a process to be performed in the OFF Attempt state. It should be noted that the processes of the flow charts in the respective states are repeatedly executed every 1/30 seconds. Moreover, as described above, in parallel with execution of these processes, the face detection process is repeatedly (every 1/30 seconds) executed. As the face detection process itself, a known technology is employed, and detailed description thereof is omitted.

(Information Processing in OFF State)

First, a process performed when the control state is the OFF state will be described with reference to FIG. 5 and FIG. 6. In this state, first, in step S1 of FIG. 5, the processor 33 refers to the face detection state flag 53 and determines whether face detection has been successful at that time point. As a result, when face detection has been successful (YES in step S1), it is not necessary to turn on infrared light, and thus, determination in step S1 will be repeated (i.e., the current state is maintained).

On the other hand, face detection has been failure (NO in step S1), the processor 33 adds 1 to the detection-failure counter 57. Then, in step S2, the processor 33 executes an ON Attempt determination process for determining whether to turn on infrared light. FIG. 6 is a flow chart showing details of the ON Attempt determination process. First, in step S11, the processor 33 determines whether the hand-held game apparatus 10 is in sufficient ambient light. This can be determined, for example, by determining brightness of light incident on the camera 101, or the like. In another embodiment, a brightness sensor dedicated to detection of brightness may be provided in the hand-held game apparatus 10.

As a result of the determination, when it has been determined that the hand-held game apparatus 10 is in sufficient ambient light (YES in step S11), it is considered that turning on of infrared light is not necessary. In this case, in step S17, the processor 33 sets the ON Attempt flag 54 to OFF. Then, the ON Attempt determination process ends. On the other hand, when it has been determined that the hand-held game apparatus 10 is not in sufficient ambient light (NO in step S11), then, in step S12, the processor 33 refers to the detection-failure counter 57 and the first threshold data 58, and determines whether the number of consecutive failures of face detection is greater than the first threshold. As a result, when the number of consecutive failures of face detection is not greater than the first threshold (NO in step S12), the process is advanced to step S17. That is, until the time period indicated by the first threshold has elapsed, the face detection process will be continued with infrared light in the turned-off state.

On the other hand, the number of consecutive failures of face detection is greater than the first threshold (YES in step S12), next, in step S13, the processor 33 determines whether there is indication that the user is present in front of the hand-held game apparatus 10. That is, it is determined whether, currently, the user is using the hand-held game apparatus 10 or has left the place, leaving the hand-held game apparatus 10 there. In the present embodiment, this determination is made based on data outputted from the motion sensor 37, whether a predetermined button operation is being performed, or the like. For example, in a case where it can be determined, based on data from the motion sensor 37, that motion of the hand-held game apparatus 10 itself is occurring, it is considered that the user is holding the hand-held game apparatus 10 with hands and is operating it. Moreover, also in a case where a predetermined button input can be detected, it can be presumed that the user is using the hand-held game apparatus 10. As a result of such determination, when there is indication that the user is present in front of the hand-held game apparatus 10 (it is considered that the user is currently using the hand-held game apparatus 10) (YES in step S13), it is considered that the user is using the hand-held game apparatus in a dark place, for example. Thus, it is necessary to immediately turn on infrared light. In this case, in step S14, the processor 33 resets the first threshold data 58 to the initial value. Next, in step S15, the processor 33 executes a process for increasing the value of the first threshold data 58. Specifically, the processor 33 calculates a new first threshold data 58 by use of the following formula.

$$\text{First threshold} = (\text{First threshold} + 1) \times 1.5 \qquad \text{formula 1}$$

It should be noted that with respect to the process of step S15, the maximum value (in this example, a value indicating a time period of three seconds) is set for the first threshold data 58 as described above. Thus, as a result of the above calculation, when the maximum value is reached, calculation thereafter will not be performed.

On the other hand, in the determination in step S13, when it has been determined that there is no indication that the user is present in front of the hand-held game apparatus 10 (NO in step S13), the process of step S14 described above is skipped and the process is advanced to step S15. That is, the first threshold data 58 is not reset, and the value thereof will be increased.

Next, in step S16, the processor 33 sets the ON Attempt flag 54 to ON. Then, the ON Attempt determination process ends.

With reference back to FIG. 5, next, in step S3, the processor 33 refers to the ON Attempt flag 54 and determines whether to make a shift to the ON Attempt state. As a result, when the ON Attempt flag 54 is OFF (NO in step S3), the OFF state will be maintained, and the process is returned to step S1 to be repeated.

On the other hand, when the ON Attempt flag 54 is ON (YES in step S3), then, in step S4, the processor 33 turns on the infrared light emitter 102. Then, in step S5, the processor 33 executes a process for making a shift to the ON Attempt state. At this time, the detection-success counter 56 and the detection-failure counter 57 are also reset. This is the end of description of the processes performed in the OFF state.

(Information Processing in ON Attempt State)

Next, a process to be performed in the ON Attempt state will be described with reference to FIG. 7. First, in step S21, the processor 33 refers to the face detection state flag 53 and determines whether face detection has been successful at that time point. As a result, when face detection has been successful (YES in step S21), then, in step S22, the processor 33 executes a process for making a shift to the ON state. At this time, the detection-success counter 56 and the detection-failure counter 57 are reset, and the first threshold data 58 is also reset.

On the other hand, when face detection has been failure (NO in step S21), then, in step S23, the processor 33 refers to the detection-failure counter 57 and the second threshold data 59, and determines whether the value of the detection-failure counter 57 is greater than the second threshold data 59. As a result, when the value of the detection-failure counter 57 is not greater than the second threshold data 59 (NO in step S23), the process is returned to step S21 to be repeated. In the present embodiment, as the second threshold data 59, a value indicating a time period corresponding to five frames is set as a fixed value. Thus, here, the face detection process will be repeated for the time period corresponding to five frames.

On the other hand, when the value of the detection-failure counter 57 is greater than the second threshold data 59 (YES in step S23), it means that face detection is consecutively failing regardless of infrared light being on (for the time period corresponding to five frames or longer). Thus, in step S24, the processor 33 turns off the infrared light emitter 102, and in step S25, executes a process of making a shift to the OFF state. This is the end of description of the process performed in the ON Attempt state.

(Information Processing in ON State)

Next, a process performed in the ON state will be described with reference to FIG. 8 and FIG. 9. First, in step S31 of FIG. 8, the processor 33 refers to the face detection state flag 53 and determines whether face detection has been successful at that time point. As a result, when face detection has been successful (YES in step S31), then, in step S32, the processor 33 executes an OFF Attempt determination process. At this time, the processor 33 adds 1 to the detection-success counter 56.

FIG. 9 is a flow chart showing details of the OFF Attempt determination process. In this process, first, it is determined whether the relative positional relationship between the user and the hand-held game apparatus 10 is stable. In the present embodiment, the following determination is performed.

First, in step S41, the processor 33 determines whether a motion having a magnitude greater than or equal to a predetermined threshold is occurring in the hand-held game apparatus 10 itself. This is determined based on, for example, whether an output from the motion sensor 37 being an angular velocity sensor, an acceleration sensor, or the like is greater than or equal to a predetermined threshold. That is, it is determined whether the user is holding the hand-held game apparatus 10 and moving it vigorously, or the like. As a result of this determination, when a motion greater than or equal to the predetermined threshold is occurring (YES in step S41), it is presumed that the relative positional relationship between the user and the hand-held game apparatus 10 is greatly changing. Here, when the relative positional relationship between the user and the hand-held game apparatus 10 is greatly changing, there is a possibility that accuracy of face detection is decreased. When taking this into consideration, in order to perform accurate face detection, it is preferable that infrared light is kept on. Therefore, in this case, in step S46, the processor 33 sets the OFF Attempt flag 55 to OFF.

On the other hand, as a result of the above determination, when no motion greater than or equal to the predetermined threshold is occurring (NO in step S41), next, in step S42, the processor 33 determines whether there is motion in the face of the user. This is assuming such a case where the user is playing while the hand-held game apparatus 10 itself is placed on a desk, for example. Even when no motion is occurring in the hand-held game apparatus 10 itself (or even when a very small motion is occurring), if a motion is recognized in the face itself of the user (in this example, the positions of the eyes of the user), it is also presumed that the relative positional relationship between the user and the hand-held game apparatus 10 is greatly changing. This determination can be made based on, for example, whether the position (the center position between the eyes) of the face of the user obtained as a result of the face detection process has moved some distance or more from a position detected in the immediately preceding frame. Alternatively, the determination can be also made, for example, by a technique of determining whether a change in the position of the face of the user in a period of most recent several frames to several tens of frames is great to some extent.

In other words, the determination in each of step S41 and S42 is determination of the magnitude of a change in relative positional relationship between the user and the hand-held game apparatus 10 (the camera 101). Therefore, not being limited to the above determination technique, as long as the magnitude of a change in the relative positional relationship can be determined, any technique may be used.

As a result of the determination in step S42, when a motion is occurring in the face of the user (YES in step S42), the process is advanced to step S46 described above. That is, at this time point, it is determined that infrared light is not to be turned off. The reason for this is as follows: in a state where the user is presumed to be present in front of the hand-held game apparatus 10, if infrared light is turned off when there is a large change in the relative positional relationship between the user and the hand-held game apparatus 10, accuracy of face detection is decreased. On the other hand, when no motion is occurring (NO in step S42), next, in step S43, the processor 33 refers to the detection-success counter 56 and the third threshold data 60, and determines whether the number of consecutive successes of face detection is smaller than the third threshold. When the number of consecutive successes is smaller than the third threshold (YES in step S43), control is performed such that turning off of infrared light is not attempted. Thus, the process is advanced to step S46 described above. On the other hand, when the number of consecutive successes is not smaller than the third threshold (i.e., greater than or equal to the third threshold) (NO in step S43), control is performed for attempting determination of whether face detection can be successful even when infrared light is turned off because the state of the surrounding has changed from a dark state to a light state, or the like. In this case, in step S44, the processor 33 executes a process for increasing the value of the third threshold data 60. Specifically, the processor 33 calculates a new third threshold data 60 by use of the following formula.

$$\text{Third threshold} = (\text{Third threshold} + 1) \times 1.5 \quad \text{formula 2}$$

It should be noted that with respect to the process of step S44, the maximum value (in this example, a value indicating a time period of 60 seconds) is set to the third threshold data 60 as described above. Thus, as a result of the above calculation, when the maximum value is reached, calculation thereafter will not be performed.

Next, in step S45, the processor 33 sets the OFF Attempt flag 55 to ON. Then, the OFF Attempt determination process ends.

With reference back to FIG. 8, next, in step S33, the processor 33 refers to the OFF Attempt flag 55 and determines whether to make a shift to the OFF Attempt state. As a result of the determination, when the OFF Attempt flag 55 is OFF (NO in step S33), the ON state is maintained. Thus, the process is returned to step S31 to be repeated.

On the other hand, when the OFF Attempt flag 55 is ON (YES in step S33), then, in step S34, the processor 33 turns off the infrared light emitter 102. Then, in step S35, the processor 33 executes a process for making a shift to the OFF Attempt state. At this time, the detection-success counter 56 and the detection-failure counter 57 are also reset. Then, in the OFF Attempt state, whether face detection in the turned-off state is successful will be determined (the process to be performed in the OFF Attempt state will be described later).

Next, description will be given of a process to be performed in a case where, as a result of the determination in step S31, face detection has been failure (NO in step S31). In this case, first, in step S36, the processor 33 refers to the detection-failure counter 57 and the fourth threshold data 61, and determines whether the number of consecutive failures of face detection is smaller than the fourth threshold. That is, it is determined, for example, whether it is a state where the user has left the front of the hand-held game apparatus 10 in a dark room. In this example, since the fourth threshold is set as a value indicating a time period of three seconds, if failure of face detection continues for three seconds or longer, the condition for the determination is satisfied.

As a result of the determination, when the number of consecutive failures is not greater than the fourth threshold (NO in step S36), the process is returned to step S31 to be repeated. On the other hand, when the number of consecutive failures is greater than the fourth threshold (YES in step S36), then, in step S37, the processor 33 turns off the infrared light emitter 102. Then, in step S38, the processor 33 executes a process for making a shift to the OFF state (as in the above, at the time of making a shift, relevant counters are reset). This is the end of description of the process performed in the ON state.

(Information Processing in OFF Attempt State)

Next, a process to be performed in the OFF Attempt state will be described with reference to FIG. 10. First, in step S51 of FIG. 10, the processor 33 refers to the face detection state flag 53 and determines whether face detection has been successful at that time point. As a result, when face detection has been successful (YES in step S51), it is not necessary to turn on infrared light, and thus, in step S52, the processor 33 executes a process for making a shift to the OFF state. On the other hand, when face detection has been failure (NO in step S51), then, in step S53, the processor 33 turns on the infrared light emitter 102 in order to attempt face detection in a state where infrared light is on. Then, in step S54, the processor 33 executes a process for making a shift to the ON state. Then, the process performed in the OFF Attempt state ends.

With respect to the processes of steps S51 and S52, the following control may be performed. That is, in turning off the infrared light emitter, assuming that the turning off is performed gradually after an instruction of the turning off has been made, when the process is to be shifted from step S51 to step S52, a time period of several frames is waited (it is waited until the infrared light emitter is completely turned off), and then, the process may be advanced to step S52. Specifically, when the determination in step S51 is YES, a process is performed of determining whether a predetermined number of frames (a time period corresponding to the predetermined number of frames) have elapsed after the instruction of the turning off has been made. As a result of this determination, when the time period has not elapsed, the process is returned to step S51, and when the time period has elapsed, the process is advanced to step S52.

Through the processes described above, for example, the following control is performed. First, in a state where face detection has been successful in the ON state, a shift to the OFF Attempt state is (forcedly) made, once. The interval of this shift starts from five seconds, and then gradually extended, to be finally 60 seconds. Next, it is determined whether face detection can be successful in the OFF Attempt state. As a result, when face detection is not successful, it is presumed that it is a state where infrared light is necessary (for example, the surrounding is dark), and thus, a shift to the ON state is made. On the other hand, when face detection has been successful, it is presumed that it is a state where infrared light is unnecessary (for example, the surrounding is light), and thus, a shift to the OFF state is made.

Furthermore, the following control is also performed. For example, when face detection consecutively fails to some extent in the ON state, it is presumed that the user has left the place and a shift to the OFF state is made once. Next, face detection is repeated for a predetermined time period in the OFF state, and when the predetermined time period has elapsed, a shift to the ON Attempt state is made once. The predetermined time period starts from 1/30 seconds, to be finally three seconds. Next, it is determined whether face detection has been successful in the ON Attempt state. When face detection has been failure, it is presumed that the user is still away from the place, and thus, a shift to the OFF state is made. On the other hand, when face detection has been successful, it is presumed that the user has returned to the place, and thus, a shift to the ON state is made.

As described above, in the present embodiment, even when face detection has been successful, turning off of infrared light is attempted, to prevent infrared light from unnecessary being on, whereby power consumption is to be reduced. Moreover, in a case where the user has left the front of the hand-held game apparatus 10 when the surrounding is dark, infrared light is turned off once, and thereafter, infrared light is periodically turned on, whereby countermeasures for a case where the user has returned are also taken. Through this control, it is intended to realize reduction of power consumption and maintaining convenience for the user by the face detection process. In particular, if the above-described control is applied to an information processing apparatus driven on a battery, effect of reduction of power consumption can be exhibited to a great extent.

In the above embodiment, control of turning off infrared light is performed when the user has left in a dark place. However, at this time, control in which hardware components other than infrared light are set to OFF may be performed. For example, control may be performed such that the upper LCD 22 and the lower LCD 12 are set to OFF associated with turning off of infrared light. Accordingly, further reduction of power consumption can be realized.

In the above embodiment, with respect to success/failure of face detection, the determination process using "the number" of successes/failures is performed. Other than "the number", a "time period" may be used to perform the determination. For example, the determination may be performed based on the time period of consecutive successes, or the time period of consecutive failures.

In the above example, the hand-held game apparatus 10 is used as one example of the information processing apparatus. Other than this, the control described in the above embodiment can be applied to various hand-held information processing apparatuses (such as smartphones), tablet terminals, notebook computers, and the like, in particular, various information processing apparatuses operable on batteries.

In the above embodiment, a case has been described in which a series of processes for controlling emission of infrared light of the hand-held game apparatus 10 is executed by a single apparatus. However, in other embodiments, the series of processes may be executed in an information processing system including a plurality of information processing apparatuses. For example, in an information processing system including a terminal side apparatus and a server side apparatus capable of communicating with the terminal side apparatus via a network, one part of the series of processes may be executed on the server side apparatus. Further, in an information processing system including a terminal side apparatus and a server side apparatus capable of communicating the terminal side apparatus via a network, main processes of the series of processes may be executed on the server side apparatus, and one part of the processes may be executed on the terminal side apparatus. Still further, in the information processing system described above, the server side system may be configured with a plurality of information processing apparatuses, and processes to be executed on the server side may be divided to be executed by the plurality of information processing apparatuses.

What is claimed is:

1. An information processing apparatus including an infrared light emitter capable of emitting infrared light and a camera capable of at least taking an infrared light image, the information processing apparatus configured to:
    control emission of the infrared light;
    repeatedly obtain an image taken by use of the camera; and
        repeatedly execute a face detection process based on the obtained image, wherein in the infrared light emission control, emission of the infrared light is stopped based on a result of the face detection process performed in the face detection, and emission of the infrared light is resumed after a lapse of a predetermined time period;
    in the infrared light emission control, emission of the infrared light is stopped when face detection with the infrared light emitted has been a failure, and emission of the infrared light is resumed after a lapse of the predetermined time period; and
    in the infrared light emission control, stopping emission of the infrared light when face detection with the infrared light emitted has been a failure and resuming the emission after a lapse of the predetermined time period are repeatedly executed, until the face detection succeeds, with the predetermined time period being gradually extended between repetitions.

2. The information processing apparatus according to claim 1, wherein
    in the infrared light emission control, emission of the infrared light is stopped when the number of consecutive failures of the face detection has become greater than a predetermined number, and emission of the infrared light is resumed after a lapse of the predetermined time period.

3. The information processing apparatus according to claim 1, wherein in the infrared light emission control, as a result of the predetermined time period being extended between repetitions, when the predetermined time period has reached a predetermined value, the predetermined time period is not extended any longer and stopping emission of the infrared light and resuming the emission after a lapse of the predetermined time period are repeatedly executed.

4. The information processing apparatus according to claim 1, wherein the information processing apparatus is further configured to detect a motion of the information processing apparatus itself, and
    in the infrared light emission control, while stopping emission of the infrared light and resuming the emission after a lapse of the predetermined time period are repeatedly executed between repetitions, when an output value of the detected motion is greater than or equal to a predetermined threshold, emission of the infrared light is resumed regardless whether the predetermined time period has elapsed.

5. The information processing apparatus according to claim 1, wherein
    the information processing apparatus is a hand-held information processing apparatus.

6. The information processing apparatus according to claim 1, wherein
    the information processing apparatus is operable on a battery.

7. A computer-readable non-transitory storage medium having stored therein an information processing program to be executed by a computer of an information processing apparatus including an infrared light emitter capable of emitting infrared light and a camera capable of at least taking an infrared light image, the information processing program causing the computer to:
    control emission of the infrared light;
    repeatedly obtain an image taken by use of the camera; and
    repeatedly execute a face detection process based on the obtained image, wherein
        in the infrared light emission control, emission of the infrared light is stopped based on a result of the face detection process performed in the face detection, and emission of the infrared light is resumed after a lapse of a predetermined time period;
        in the infrared light emission control, emission of the infrared light is stopped when face detection with the infrared light emitted has been a failure, and emission of the infrared light is resumed after a lapse of the predetermined time period; and in the infrared light emission control, stopping emission of the infrared light when face detection with the infrared light emitted has been a failure and resuming the emission after a lapse of the predetermined time period are repeatedly executed, until the face detection succeeds, with the predetermined time period being gradually extended between repetitions.

8. An information processing method for controlling an information processing apparatus including an infrared light emitter capable of emitting infrared light and a camera capable of at least taking an infrared light image, the method comprising:

controlling the infrared light emitter so as to control emission of the infrared light;

repeatedly obtaining an image taken from the camera; and repeatedly executing a face detection process using at least one computer processor based on the obtained image; wherein in the infrared light emission control, emission of the infrared light is stopped based on a result of the face detection process performed in the face detection, and emission of the infrared light is resumed after a lapse of a predetermined time period;

in the infrared light emission control, emission of the infrared light is stopped when face detection with the infrared light emitted has been a failure, and emission of the infrared light is resumed after a lapse of the predetermined time period; and in the infrared light emission control, stopping emission of the infrared light when face detection with the infrared light emitted has been a failure and resuming the emission after a lapse of the predetermined time period are repeatedly executed, until the face detection succeeds, with the predetermined time period being gradually extended between repetitions.

* * * * *